US009936457B2

(12) United States Patent
Brown et al.

(10) Patent No.: US 9,936,457 B2
(45) Date of Patent: Apr. 3, 2018

(54) ENSURING BATTERY RESERVE FOR MOBILE COMMUNICATION

(71) Applicant: International Business Machines Corporation, Armonk, NY (US)

(72) Inventors: Gene L. Brown, Durham, CT (US); Brendan F. Coffey, Rhinebeck, NY (US); Christopher J. Dawson, Arlington, VA (US); Clifford V. Harris, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/083,870

(22) Filed: Mar. 29, 2016

(65) Prior Publication Data

US 2017/0289914 A1 Oct. 5, 2017

(51) Int. Cl.
*H04W 52/02* (2009.01)
*G06F 1/32* (2006.01)

(52) U.S. Cl.
CPC ... *H04W 52/0258* (2013.01); *H04W 52/0264* (2013.01); *G06F 1/3212* (2013.01); *G06F 1/3234* (2013.01); *G06F 1/3287* (2013.01); *H04W 52/0261* (2013.01); *Y02B 60/1292* (2013.01)

(58) Field of Classification Search
CPC ............ H04W 52/02; H04W 52/0209; H04W 52/0225; H04W 52/0251; H04W 52/0261; H04W 52/0264; H04W 52/0274; H04W 52/028; H04W 52/0296; G06F 1/32; G06F 1/3203; G06F 1/3206; G06F 1/3212; G06F 1/3215; Y02B 60/1292

USPC ................................. 455/574, 343.1–343.6
See application file for complete search history.

(56) References Cited

U.S. PATENT DOCUMENTS

| 8,135,443 | B2 | 3/2012 | Aleksic et al. | |
|---|---|---|---|---|
| 8,380,999 | B1* | 2/2013 | Robison | H04W 52/0261 320/120 |
| 8,655,307 | B1* | 2/2014 | Walker | H04W 52/0212 455/343.5 |
| 9,009,502 | B2 | 4/2015 | Udeshi et al. | |
| 9,210,662 | B1* | 12/2015 | Brown | H04W 52/0261 |
| 2005/0189913 | A1* | 9/2005 | Vitanov | H02J 7/0054 320/114 |
| 2005/0240786 | A1* | 10/2005 | Ranganathan | G06F 1/3215 713/320 |
| 2008/0133956 | A1* | 6/2008 | Fadell | G06F 1/3203 713/340 |
| 2008/0136596 | A1* | 6/2008 | Yeo | G06K 19/0705 340/10.1 |

(Continued)

FOREIGN PATENT DOCUMENTS

CN 101287037 A 10/2008

*Primary Examiner* — Duc M Nguyen
(74) *Attorney, Agent, or Firm* — Edward J. Wixted, III

(57) ABSTRACT

A usage history for a mobile device is determined. The usage history is based upon historical analytics for a user. A battery reserve in the mobile device is monitored. Whether a threshold battery reserve for a battery in the mobile device, based upon the monitored battery reserve, is determined. In response to determining that a threshold battery reserve for the battery in the mobile device has been met, a power save mode is implemented for the mobile device to reduce battery consumption by the mobile device based on the determined usage history. The power save mode includes utilizing at least one of a battery partition and a second battery.

20 Claims, 4 Drawing Sheets

(56) References Cited

U.S. PATENT DOCUMENTS

| | | | |
|---|---|---|---|
| 2008/0278345 A1* | 11/2008 | Van Bosch | H04B 7/18517 340/870.07 |
| 2010/0106994 A1* | 4/2010 | Challener | G06F 1/3203 713/330 |
| 2011/0009172 A1* | 1/2011 | Song | H04M 1/72544 455/573 |
| 2011/0320828 A1* | 12/2011 | Boss | G06F 1/3209 713/300 |
| 2012/0065802 A1* | 3/2012 | Seeber | G06F 1/3203 700/295 |
| 2012/0151055 A1* | 6/2012 | Kansal | G06F 1/3209 709/225 |
| 2012/0159210 A1* | 6/2012 | Hosaka | G06F 1/3212 713/320 |
| 2012/0169608 A1* | 7/2012 | Forutanpour | G09G 3/342 345/173 |
| 2013/0079944 A1* | 3/2013 | Kon | H02J 7/35 700/297 |
| 2013/0173947 A1* | 7/2013 | Nomura | G01R 31/3613 713/340 |
| 2013/0191662 A1* | 7/2013 | Ingrassia, Jr. | G06F 1/3206 713/320 |
| 2013/0196720 A1* | 8/2013 | Sivaraman | H04W 52/0261 455/573 |
| 2014/0075234 A1* | 3/2014 | Stekkelpak | H04M 1/72569 713/340 |
| 2014/0120961 A1* | 5/2014 | Buck | H04W 4/12 455/466 |
| 2014/0128021 A1* | 5/2014 | Walker | H04W 52/0212 455/405 |
| 2014/0155125 A1* | 6/2014 | Thill | H04M 1/0262 455/572 |
| 2014/0195826 A1* | 7/2014 | Wojcik | H05K 5/0086 713/300 |
| 2014/0365790 A1 | 12/2014 | Chen et al. | |
| 2015/0084778 A1* | 3/2015 | Mittal | G01R 19/16542 340/636.16 |
| 2015/0189594 A1* | 7/2015 | Liang | H04W 52/0225 455/574 |
| 2015/0293575 A1* | 10/2015 | Hampson et al. | G06K 19/0705 340/10.1 |
| 2015/0323974 A1* | 11/2015 | Shuster | G06F 1/3212 713/320 |
| 2015/0372539 A1* | 12/2015 | Livadaras | G05B 15/02 700/297 |
| 2016/0291683 A1* | 10/2016 | Kacker | G06F 1/3212 |

* cited by examiner

ENSURING BATTERY RESERVE FOR MOBILE COMMUNICATION

BACKGROUND OF THE INVENTION

The present invention relates generally to the field of mobile communication devices, and more particularly to ensuring battery reserve for a mobile communication device.

It is estimated that nearly two-thirds of Americans own a smartphone. And for an increasing number of smartphone owners, their smartphone is their only means of accessing the Internet at home. First and foremost, a smartphone is used for communication, and for some owners of smartphones, the only method of telecommunication since many no longer have a traditional land line. Methods of communication include cellular phone calls, Voice over Internet Protocol (VoIP) phone calls, and texting. Beyond communication, a smartphone may be used for banking, Social Media, games, maps and directions, shopping, etc. All of these smartphone activities consume battery power.

SUMMARY

Embodiments of the present invention include a method, computer program product, and system for ensuring battery reserve for a mobile device. In one embodiment, a usage history for a mobile device is determined. The usage history is based upon historical analytics for a user. A battery reserve in the mobile device is monitored. Whether a threshold battery reserve for a battery in the mobile device, based upon the monitored battery reserve, is determined. In response to determining that a threshold battery reserve for the battery in the mobile device has been met, a power save mode is implemented for the mobile device to reduce battery consumption by the mobile device based on the determined usage history. The power save mode includes utilizing at least one of a battery partition and a second battery.

DETAILED DESCRIPTION

Some embodiments of the present invention recognize that many people rely on a smartphone for phone calls, texting, streaming audio and video files, and general Internet access. Smartphone activities consume power and contribute to draining the battery found in the smartphone. Imagine a smartphone user sitting in an airport terminal, streaming the latest blockbuster movie, and then the user's smartphone rings. As the user glances at the ringing smartphone, the user sees the call is from the wife of the user. And then the smartphone battery runs out and the user misses the call.

Embodiments of the present invention recognize that there may be a method, computer program product, and computer system for ensuring battery reserve for a mobile communication device. The method, computer program product, and computer system may monitor the application usage of the user, monitor the battery life of the mobile communication device, and shut down applications as battery life is consumed. The result is that the user will have a battery reserve available so that the user does not miss any communication regardless of whether the communication is routine or important.

Figure 1:
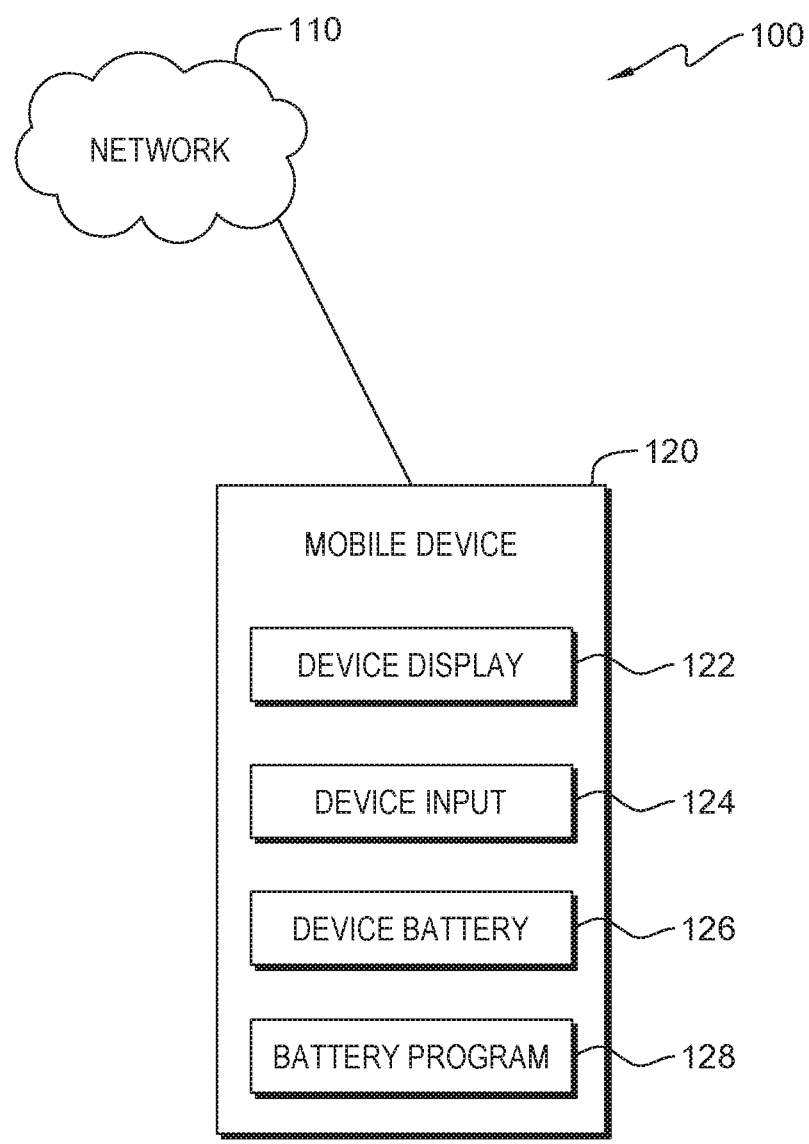
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes mobile device 120 which includes device display 122, device input 124, device battery 126, and battery program 128. Mobile device 120 is connected to network 110. In example embodiments, computing environment 100 may include other computing devices not shown such as smart-watches, cell phones, smartphones, phablets, tablet computers, laptop computers, desktop computers, other computer servers or any other computer system known in the art, interconnected with mobile device 120 over network 110.

In example embodiments, mobile device 120 may connect to network 110 which enables mobile device 120 to access other computing devices and/or data not directly stored on mobile device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between mobile device 120 and other computing devices (not shown) within computing environment 100, in accordance with embodiments of the present invention.

In embodiments of the present invention, mobile device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, mobile device 120 represents a computer system utilizing clustered computers and components (e.g., database server computers, application server computers, etc.) that act as a single pool of seamless resources when accessed by elements of computing environment 100. In general, mobile device 120 is representative of any electronic device or combination of electronic devices capable of executing computer readable program instructions. Computing environment 100 may include any number of mobile device 120. Mobile device 120 may include components as depicted and described in further detail with respect to FIG. 4, in accordance with embodiments of the present invention.

In an embodiment, device display 122 may be a touch screen. A touch screen is a technology, used in conjunction with a user interface (not shown) which allows mobile device 120 to accept user input. A touch screen is an input device layered on top of a display for allowing a user to control an electronic device via simple or multi-touch gestures by touching the display with a special stylus and/or one or more fingers. Touch screens are included in many electronic devices such as game consoles, tablet computers, phablets, smartphones, PDAs, and the like. In example embodiments, a touch screen may include the following technologies: resistive; surface acoustic wave; capacitive, including surface capacitance; projected capacitance; mutual capacitance; and self-capacitance; infrared grid; infrared acrylic projection; optical imaging; dispersive signal technology; acoustic pulse recognition; and the like. In one embodiment, a touch screen may include haptic feedback, an example of which is a vibratory response to the touch of the touch screen.

In an embodiment, device input 124 may be a peripheral (i.e., a piece of computer hardware equipment) used to provide data and control signals to an information processing system such as a computer, smartphone, or other information appliance. In an embodiment, device display 122 provides data and control signals to mobile device 120. According to an embodiment of the present invention, device input 124 may be a keyboard (e.g., a keyboard on a flip style cell phone). A keyboard is a human interface device which is represented as a layout of buttons. Each button, or key, may be used to either input a linguistic character to a computer, or to call upon a particular function of the computer. Keyboards act as the main text entry interface for most users. According to another embodiment of the present invention, device input 124 may be a touch screen such as device display 122.

In an embodiment, device battery 126 is a rechargeable battery that supplies power to a mobile communication device. A rechargeable battery is a type of electrical battery which can be charged, discharged into a load, and recharged many times. It is composed of one or more electrochemical cells. Rechargeable batteries are produced in many different shapes and sizes, ranging from button cells to megawatt systems connected to stabilize an electrical distribution network. Several different combinations of electrode materials and electrolytes are used, including lead-acid, nickel cadmium (NiCd), nickel metal hydride (NiMH), lithium ion (Li-ion), and lithium ion polymer (Li-ion polymer). Rechargeable batteries initially cost more than disposable batteries, but have a much lower total cost of ownership and environmental impact, as they can be recharged inexpensively many times before they need replacing. Some rechargeable battery types are available in the same sizes and voltages as disposable types, and can be used interchangeably with them. In an embodiment, device battery 126 is a single, internal battery in mobile device 120. In another embodiment, device battery 126 is a discrete, second internal battery in mobile device 120. In yet another embodiment, device battery 126 is a single battery with at least two partitions in mobile device 120. A battery partition allows for power to be provided for a particular function based on a partitioning profile. The partition profile may be changed based on a pattern of usage or a preference of a user. Battery partitions may be recharged in a particular priority or all together allowing the user of a mobile communication device to prioritize the charging process. The battery partitions may be re-assigned within the battery.

In embodiments of the present invention, battery program 128 may be a program, subprogram of a larger program, application, plurality of applications, or mobile application software which functions to ensure battery reserve for mobile communication. A program is a sequence of instructions written by a programmer to perform a specific task. Battery program 128 may run by itself or may be dependent on system software (not shown) to execute. In one embodiment, battery program 128 functions as a stand-alone program residing on mobile device 120. In another embodiment, battery program 128 may be included as a part of an operating system (not shown) of mobile device 120. In yet another embodiment, battery program 128 may work in conjunction with other programs, applications, etc., found on mobile device 120 or in computing environment 100. In yet another embodiment, battery program 128 may be found on other computing devices (not shown) in computing environment 100 which are interconnected to mobile device 120 via network 110.

According to embodiments of the present invention, battery program 128 functions to ensure battery reserve for mobile communication. According to an embodiment of the present invention, battery program 128 monitors the battery on a mobile communication device and utilizes the application usage of a user to shut down applications as battery power is consumed resulting in maintaining a battery reserve for mobile communication. In an embodiment, mobile communication includes cellular phone calls, text messages, and Voice over Internet Protocol (VoIP) phone calls.

Figure 2:
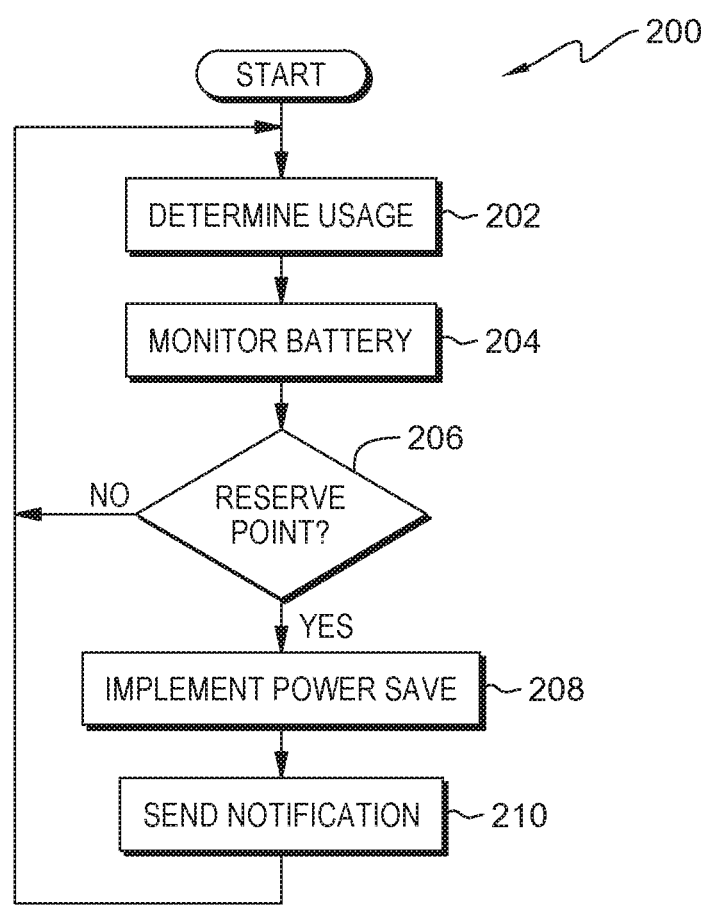
FIG. 2 is a flowchart depicting operational steps of a program that functions to ensure battery reserve for a mobile communication device, in accordance with an embodiment of the present invention.

FIG. 2 is a flowchart of workflow 200 representing operational steps for ensuring battery reserve for a mobile communication device, in accordance with an embodiment of the present invention. In one embodiment, battery program 128 performs the operational steps of workflow 200. In an alternative embodiment, while working with battery program 128 any other program may perform the operational steps of workflow 200. In an embodiment, battery program 128 may invoke the operational steps of workflow 200 automatically upon a user turning on mobile device 120. In another embodiment, battery program 128 may invoke the operational steps of workflow 200 when a pre-defined battery reserve threshold is met on mobile device 120.

In an embodiment, battery program 128 determines usage (step 202). In other words, battery program 128 determines the usage of a mobile communication device by a user. In an embodiment, battery program 128 determines usages such as the following: general usage location, amount of time spent at a usage location, cellular power requirements based on usage location, digital data power requirements based on usage location, general usage time of day, specific application usage (i.e., how often a specific application is used, what time of day the application is used, cellular power requirement of the specific application, digital data power requirements of the specific application, etc.), and the like. In an embodiment, the determination of these various usages result in creating a set of historical analytics for the user and the particular mobile communication device which allows for battery program 128 to then turn off the various applications, stored to the mobile communication device, based on battery reserve.

In an embodiment, battery program 128 determines the usage of mobile device 120. For example, Joe does not use a smartphone during business hours (Monday through Friday, 8:00 AM to 5:00 PM). After hours, Joe plays any number of games on the smartphone; this goes on until 11:00

PM when Joe goes to bed. On Saturday and Sunday, Joe enjoys day trips and uses the global positioning system (GPS) and mapping features on the smartphone. When Joe stays home on the weekend, Joe often plays games and streams movies and/or music on the smartphone. Anytime the mobile communication device is turned on, background applications are running and consuming power. Such background applications include seeking a Wi-Fi (wireless fidelity) signal, running periodic security scans, calendar functions, syncing functions, notification functions, etc.

In an embodiment, battery program 128 monitors the battery (step 204). In other words, battery program 128 monitors the battery level so that the amount of battery reserve is known at all times. According to an embodiment of the present invention, battery program 128, in conjunction with the set of historical analytics determined in step 202, allow for a more accurate assessment of battery reserve. In other words, a twenty percent battery reserve may translate to a time remaining estimate for battery life of a mobile communication device. This is based on battery program 128 knowing the location of the mobile communication device, the applications a user may use at that particular time of day in that location, and the power requirements for those applications in that location. In an embodiment, battery program 128 monitors device battery 126 in mobile device 120. For example, Joe charges the battery overnight in the smartphone so in the morning, the battery level is one hundred percent. At 5:00 P.M. when the workday is done, the battery level has dropped to eighty percent. On the weekend when Joe is using the GPS function or streaming a movie, the battery reserve drops by twenty percent every hour (i.e., eighty percent after one hour, sixty four percent after two hours, etc.).

In an embodiment, battery program 128 determines whether a reserve point has been met (decision step 206). In other words, battery program 128 uses the monitored battery results from step 204 to determine if a reserve point of the battery reserve in the mobile communication device has been met. A reserve point is a level in the battery reserve at which an action is taken to turn off an application or plurality of applications in order to reduce power consumption and save battery reserve. In an embodiment, there may be a single reserve point (e.g., at five percent battery reserve, turn off everything with the exception of cellular communication). In another embodiment, the pre-defined battery levels corresponding to reserve points may be set by the user (e.g., at seventy five percent battery reserve, turn off the GPS, at fifty percent battery reserve, turn off cellular data, at twenty five percent battery reserve, turn off digital data, and at five percent battery reserve, turn off everything except cellular communication). In yet another embodiment, any number of reserve points may be determined by battery program 128 based on the determined set of historical analytics. In one embodiment (decision step 206, NO branch), a reserve point has not been met; therefore, battery program 128 returns to step 202 to determine usage and monitor the battery. In another embodiment (decision step 206, YES branch), a reserve point has been met; therefore, battery program 128 proceeds to step 208.

In an embodiment, battery program 128 implements power save (step 208). In other words, responsive to battery program 128 determining that a reserve point has been met (decision step 206, YES branch), battery program 128 implements a power save mode in order to reduce battery consumption and preserve battery power. In an embodiment, battery program 128 turns off an application (not shown) on mobile device 120. For example, if Joe is at home streaming a movie and the smartphone battery drops to seventy five percent, the GPS function on the smartphone is turned off since Joe does not need to use the GPS at home. Conversely, if Joe is on a day trip on a Saturday and the smartphone battery level drops to seventy five percent, some other application or plurality of applications would be turned off since based on location, Joe may need to use the GPS and an associated mapping application.

In an embodiment, battery program 128 sends a notification (step 210). In other words, battery program 128 sends a notification to the user of the mobile communication device that power saver mode has been implemented. According to an embodiment of the present invention, the notification is at least one of an audio alert (e.g., a beep), a visual alert (e.g., a flashing notification light or a text notification), and a haptic alert (e.g., a vibration). In an embodiment, a text notification may include a simple statement such as "Power Save". In another embodiment, a text notification may include a more detailed statement such as "Power Save On, GPS Function Turned Off". In yet another embodiment, a text notification may include the battery reserve level (e.g., "Battery Reserve at 75%"). In yet another embodiment, a text notification may include an estimated remaining life of the battery based on the set of historical analytics of the user (e.g., "8.5 Hours Remaining Battery Reserve"). In an embodiment, battery program 128 sends a text notification which is shown on device display 122 on mobile device 120. For example, Joe receives a text notification on the smartphone that states "Battery Reserve at 5%, Only Cellular Communication Available".

Figure 3:
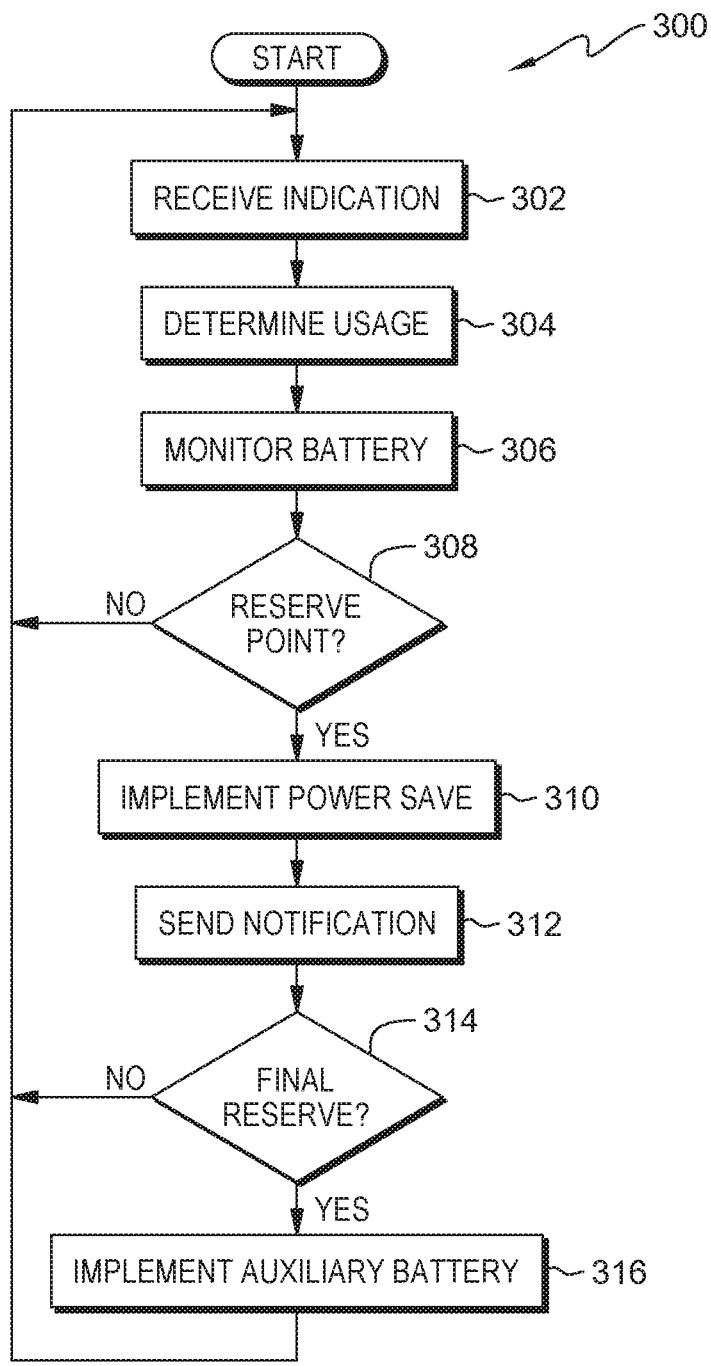
FIG. 3 is a flowchart depicting operational steps of a program that functions to ensure battery reserve for a mobile communication device when a battery partition or second battery is available, in accordance with an embodiment of the present invention.

FIG. 3 is a flowchart of workflow 300 representing operational steps for ensuring battery reserve for a mobile communication device when a battery partition or second battery is available, in accordance with an embodiment of the present invention. In one embodiment, battery program 128 performs the operational steps of workflow 300. In an alternative embodiment, while working with battery program 128 any other program may perform the operational steps of workflow 300. In an embodiment, battery program 128 may invoke the operational steps of workflow 300 automatically upon a user turning on mobile device 120. In another embodiment, battery program 128 may invoke the operational steps of workflow 300 when a pre-defined battery reserve threshold is met on mobile device 120.

In an embodiment, battery program 128 receives an indication (step 302). In other words, battery program 128 receives an indication from a user of a mobile communication device of a change in the battery configuration for the mobile communication device. In an embodiment, the mobile communication device may have a single internal battery that cannot be partitioned. In another embodiment, the mobile communication device may have a single internal battery that can be partitioned into at least two partitions. In yet another embodiment, the mobile communication device may have more than one internal battery and none of the batteries can be partitioned. In yet another embodiment, the mobile communication device may have more than one internal battery and at least one can be partitioned into at least two partitions. According to embodiments of the present invention, a battery partition allows for a portion of the battery to be used for a specific application or a number of applications of the mobile communication device. In an embodiment, the battery partition may be determined by a user of the mobile communication device. In another embodiment, the battery partition may be determined by battery program 128. In yet another embodiment, a user of the mobile communication device may determine which applications on the mobile communication device consume power from which of the more than one internal batteries. In yet another embodiment, battery program 128 may determine which applications on the mobile communication device consume power from which of the more than one internal batteries.

According to an embodiment of the present invention, battery program 128 partitions device battery 126 into two partitions and only cellular communication can consume power from the second partition. In an embodiment, the first (or primary) partition comprises ninety five percent of the capacity of device battery 126 and the second (or auxiliary) partition comprises five percent of the capacity of device battery 126. For example, Joe partitions the single internal battery in a smartphone into two partitions. Joe sets the partitions to be variable based on location. When at home, the primary partition comprises ninety five percent of the capacity of the battery and the auxiliary partition comprises five percent of the capacity of the battery. When away from home, as determined by a pre-defined distance and the GPS in the mobile communication device, the primary partition comprises eighty percent of the capacity of the battery and the auxiliary partition comprises twenty percent of the capacity of the battery. Regardless of whether Joe is at home or away from home, Joe determines that the only application that may consume battery reserve from the auxiliary partition is cellular communication.

In another embodiment, device battery 126 in mobile device 120 is a single battery with at least two partitions. A battery partition allows for power to be provided for a particular function based on a partition profile. The partition profile may be changed based on a pattern of usage or a preference of a user. Individual battery partitions may be recharged in a particular priority or all together, allowing the user of mobile device 120 to prioritize the recharging process. According to embodiments of the present invention, the number of battery partitions as well as the partition capacities may be re-assigned within the battery by the user or by battery program 128. For example, if Joe is a salesman whose employer requires that Joe is available via phone at all times, Joe may need to set a high reserve for cellular communication for one of the battery partitions. However, if Joe was a stay-at-home Dad, Joe may not require such a high reserve for cellular communication.

In an embodiment, battery program 128 determines usage (step 304). In other words, battery program 128 determines the usage of a mobile communication device by a user. In an embodiment, battery program 128 determines usages such as the following: general usage location, amount of time spent at a usage location, cellular power requirements based on usage location, digital data power requirements based on usage location, general usage time of day, specific application usage (i.e., how often a specific application is used, what time of day the application is used, cellular power requirement of the specific application, digital data power requirements of the specific application, etc.), and the like. In an embodiment, the determination of these various usages results in creating a set of historical analytics for the user and the particular mobile communication device which allows for battery program 128 to then turn off the various applications, stored to the mobile communication device, based on battery reserve. In an embodiment, battery program 128 determines the usage of mobile device 120. For example, Joe does not use a smartphone during business hours (Monday through Friday, 8:00 A.M. to 5:00 P.M.). After hours, Joe plays any number of games on the smartphone; this goes on until 11:00 P.M. when Joe goes to bed. On Saturday and Sunday, Joe enjoys day trips and uses the global positioning system (GPS) and mapping features on the smartphone. If Joe stays home on the weekend, Joe often plays games and streams movies and/or music on the smartphone. Anytime the mobile communication device is turned on, background applications are running and consuming power. Such background applications include seeking a Wi-Fi (wireless fidelity) signal, running periodic security scans, calendar functions, syncing functions, notification functions, etc. In another embodiment, battery program 128 determines a usage pattern by a user of mobile device 120. For example, if Joe leaves the office daily for a two hour commute home, battery program 128 may determine this usage pattern. If the current battery reserve will not last for the entire two hour commute, battery program 128 may notify Joe in advance of Joe departing for home to charge device battery 126 in mobile device 120. Battery program 128 may also change the current battery partitions to ensure that Joe has battery reserve for communication.

In an embodiment, battery program 128 monitors the battery (step 306). In other words, battery program 128 battery program 128 monitors the battery level so that the amount of battery reserve is known at all times. According to an embodiment of the present invention, battery program 128, in conjunction with the set of historical analytics determined in step 304, allow for a more accurate assessment of battery reserve. In other words, a twenty percent battery reserve may translate to a time remaining estimate for battery life of a mobile communication device. This is based on battery program 128 knowing the location of the mobile communication device, the applications a user may use at that particular time of day in that location, and the power requirements for those applications in that location. In an embodiment, battery program 128 monitors device battery 126 in mobile device 120. For example, Joe charges the battery overnight in the smartphone so in the morning, the battery level is one hundred percent. At 5:00 P.M. when the workday is done, the battery level has dropped to eighty percent. On the weekend when Joe is using the GPS function or streaming a movie, the battery reserve drops by twenty percent every hour (i.e., eighty percent after one hour, sixty four percent after two hours, etc.).

In an embodiment, battery program 128 determines whether a reserve point has been met (decision step 308). In other words, battery program 128 uses the monitored battery results in step 306 to determine if an intermediate reserve point of the battery reserve in the mobile communication device has been met. A reserve point is a level in the battery reserve at which an action is taken to turn off an application or plurality of applications in order to reduce power consumption and save battery reserve. In an embodiment, there may be a single reserve point (e.g., at five percent battery reserve, turn off everything with the exception of cellular communication). In another embodiment, the pre-defined battery levels corresponding to reserve points may be set by the user (e.g., at seventy five percent battery reserve, turn off the GPS, at fifty percent battery reserve, turn off cellular data, at twenty five percent battery reserve, turn off digital data, and at zero percent battery reserve, turn off everything except cellular communication and switch to the auxiliary battery). In yet another embodiment, any number of reserve points may be determined by battery program 128 based on the determined set of historical analytics. In one embodiment (decision step 308, NO branch), a reserve point has not been met; therefore, battery program 128 returns to step 302 to receive any battery indications, determine usage and monitor the battery. In another embodiment (decision step 308, YES branch), a reserve point has been met; therefore, battery program 128 proceeds to step 310.

In an embodiment, battery program 128 implements power save (step 310). In other words, responsive to battery program 128 determining that a reserve point has been met (decision step 308, YES branch), battery program 128 implements a power save mode in order to reduce battery consumption and preserve battery power. In an embodiment, battery program 128 turns off an application (not shown) on mobile device 120. For example, if Joe is at home streaming a movie and the smartphone battery drops to seventy five percent, the GPS function on the smartphone is turned off since Joe does not need to use the GPS at home. Conversely, if Joe is on a day trip on a Saturday and the smartphone battery level drops to seventy five percent, some other application or plurality of applications would be turned off since based on location, Joe may need to use the GPS application and an associated mapping application.

In an embodiment, battery program 128 sends a notification (step 312). In other words, battery program 128 sends a notification to the user of the mobile communication device that power saver mode has been implemented. According to an embodiment of the present invention, the notification is at least one of an audio alert (e.g., a beep), a visual alert (e.g., a flashing notification light or a text notification), and a haptic alert (e.g., a vibration). In an embodiment, a text notification may include a simple statement such as "Power Save". In another embodiment, a text notification may include a more detailed statement such as "Power Save On, GPS Function Turned Off". In yet another embodiment, a text notification may include the battery reserve level (e.g., "Battery Reserve at 75%"). In yet another embodiment, a text notification may include an estimated remaining life of the battery based on the set of historical analytics of the user (e.g., "8.5 Hours Remaining Battery Reserve"). In an embodiment, battery program 128 sends a text notification which is shown on device display 122 on mobile device 120. For example, Joe receives a text notification on the smartphone that states "Battery Reserve at 5%, Only Cellular Communication Available".

In an embodiment, battery program 128 determines whether a final reserve point has been met (decision step 314). In other words, battery program 128 determines that a final reserve point rather than an intermediate reserve point has been met and battery power will be switched to the auxiliary battery. In an embodiment, the auxiliary battery may be a second internal battery in the mobile communication device. In another embodiment, the auxiliary battery may be a partition in the primary battery in the mobile communication device. In one embodiment (decision step 314, NO branch), a final reserve point has not been met; therefore, battery program 128 returns to step 302 to receive any battery indications, determine usage and monitor the battery. In another embodiment (decision step 314, YES branch), a final reserve point has been met; therefore, battery program 128 proceeds to step 316.

In an embodiment, battery program 128 implements the auxiliary battery (step 316). In other words, responsive to determining that a final reserve point has been met (decision step 314, YES branch), battery program 128 switches battery power to an auxiliary battery. In an embodiment, battery program 128 switches the battery power in mobile device 120 to a second partition (not shown) in device battery 126. For example, the battery in the smartphone that Joe is using has been consumed by ninety five percent resulting in a switch to a second partition in the battery which is dedicated for only cellular communication. In another embodiment, battery program 128 switches the battery power in mobile device 120 to a second battery (not shown) in mobile device 120. For example, the primary battery in the smartphone that Joe is using has consumed all of the battery reserve resulting in a switch to a second battery in the smartphone and the second battery is used only for cellular communication.

Figure 4:
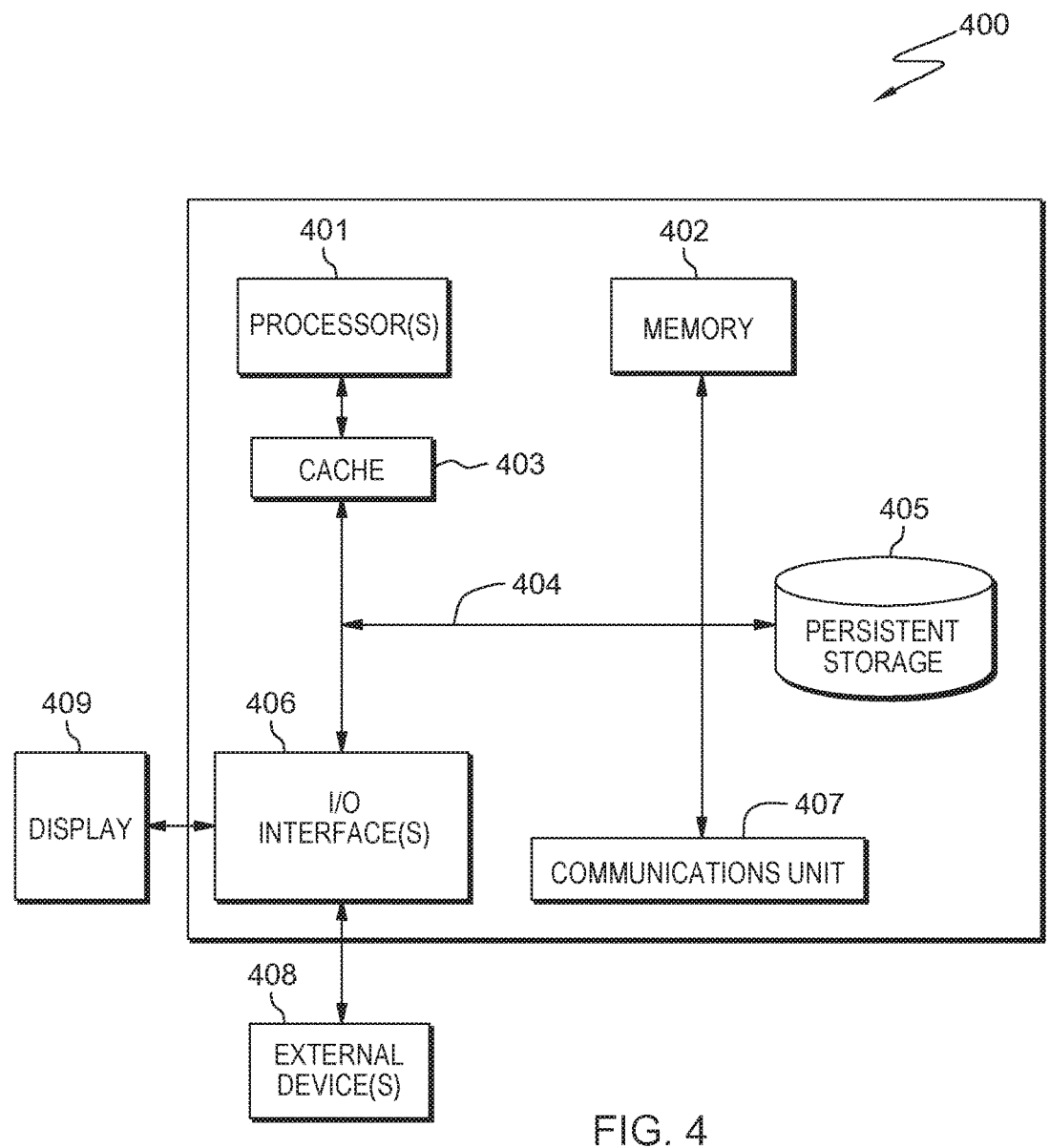
FIG. 4 depicts a block diagram of the components of the computing environment of FIG. 1, in accordance with an embodiment of the present invention.

FIG. 4 depicts computer system 400 which is an example of a system that includes battery program 128. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for ensuring a battery reserve, the method comprising:
   determining, by one or more computer processors, a usage history of functions for a mobile device, wherein the determined usage history of the functions is based upon historical analytics for a user;
   monitoring, by one or more computer processors, a battery reserve in the mobile device;
   identifying, by one or more computer processors, a change in location of the mobile device from a first location to a second location;
   adjusting, by one or more computer processors, a threshold battery reserve automatically based on the change in location of the mobile device;
   determining, by one or more computer processors, whether the adjusted threshold battery reserve for a battery in the mobile device has been met based upon the monitored battery reserve; and
   responsive to determining that a threshold battery reserve for the battery in the mobile device has been met:
      determining, by one or more computer processors, a function to disable based on the determined usage history of the function for the mobile device and a current usage of the mobile device, wherein the current usage is based on the second location, and
      implementing, by one or more computer processors, a power save mode for the mobile device to reduce battery consumption by the mobile device, wherein the power save mode includes disabling the function and utilizing at least one of a battery partition and a second battery.

2. The method of claim 1, wherein the power save mode includes switching to at least one of: the battery partition in the battery of the mobile device which has not met the adjusted threshold battery reserve and to the second battery in the mobile device which has not met the adjusted threshold battery reserve, wherein the battery partition in the battery of the mobile device which has not met the adjusted threshold battery reserve and the second battery in the mobile device which has not met the adjusted threshold battery reserve are dedicated to at least one specific application included in the mobile device.

3. The method of claim 2, wherein the battery partition which has not met the adjusted threshold battery reserve only allows for a portion of the battery to be used for at least one specific application of the mobile device, wherein individual battery partitions are recharged in a particular priority, and wherein the particular priority is based on a selection by the user.

4. The method of claim 1, wherein the power save mode includes both turning off at least one application in the mobile device to reduce power consumption by the mobile device and at least one of: switching to the battery partition in the battery of the mobile device which has not met the adjusted threshold battery reserve or to the second battery in the mobile device which has not met the adjusted threshold battery reserve.

5. The method of claim 1, further comprising:
   receiving, by one or more computer processors, an indication from the user of the mobile device of a change in a battery configuration in the mobile device, wherein the battery configuration indicates a number of batteries in the mobile device and wherein the battery configuration indicates a number of battery partitions, a partition capacity for each of the number of battery partitions, and a specific application or plurality of applications assigned to each of the number of battery partitions for each battery in the mobile device.

6. The method of claim 1, wherein the historical analytics for the user include at least one of the following: a usage location, a time spent at the usage location, a cellular power requirement based on the usage location, a digital data power requirement based on the usage location, a time of day the user is at the usage location, and an application being used by the user at the time of day the user is at the usage location.

7. The method of claim 1, wherein the second battery is internal to the mobile device.

8. A computer program product for ensuring a battery reserve, the computer program product comprising:
   one or more computer readable storage media; and
   program instructions stored on the one or more computer readable storage media, the program instructions comprising:
      program instructions to determine a usage history of functions for a mobile device, wherein the determined usage history of the functions is based upon historical analytics for a user;
      program instructions to monitor a battery reserve in the mobile device;
      program instructions to identify a change in location of the mobile device from a first location to a second location;
      program instructions to adjust a threshold battery reserve automatically based on the change in location of the mobile device;
      program instructions to determine whether the adjusted threshold battery reserve for a battery in the mobile device has been met based upon the monitored battery reserve; and
      responsive to determining that a threshold battery reserve for the battery in the mobile device has been met:
         program instructions to determine a function to disable based on the determined usage history of the function for the mobile device and a current usage of the mobile device, wherein the current usage is based on the second location, and
         program instructions to implement a power save mode for the mobile device to reduce battery consumption by the mobile device, wherein the power save mode includes disabling the function and utilizing at least one of a battery partition and a second battery.

9. The computer program product of claim 8, wherein the power save mode includes turning off at least one application in the mobile device to reduce power consumption by the mobile device.

10. The computer program product of claim 8, wherein the power save mode includes switching to at least one of: the battery partition in the battery of the mobile device which has not met the adjusted threshold battery reserve and to the second battery in the mobile device which has not met the adjusted threshold battery reserve, wherein the battery partition in the battery of the mobile device which has not met the adjusted threshold battery reserve and the second battery in the mobile device which has not met the adjusted threshold battery reserve are dedicated to at least one specific application included in the mobile device.

11. The computer program product of claim 10, wherein the battery partition which has not met the adjusted threshold battery reserve only allows for a portion of the battery to be used for at least one specific application of the mobile device, wherein individual battery partitions are recharged in a particular priority, and wherein the particular priority is based on a selection by the user.

12. The computer program product of claim 8, wherein the power save mode includes both turning off at least one application in the mobile device to reduce power consumption by the mobile device and at least one of: switching to the battery partition in the battery of the mobile device which has not met the adjusted threshold battery reserve or to the second battery in the mobile device which has not met the adjusted threshold battery reserve.

13. The computer program product of claim 8, further comprising program instructions stored on the one or more computer readable storage media, to:
receive an indication from the user of the mobile device of a change in a battery configuration in the mobile device, wherein the battery configuration indicates a number of batteries in the mobile device and wherein the battery configuration indicates a number of battery partitions, a partition capacity for each of the number of battery partitions, and a specific application or plurality of applications assigned to each of the number of battery partitions for each battery in the mobile device.

14. The computer program product of claim 8, wherein the historical analytics for the user include at least one of the following: a usage location, a time spent at the usage location, a cellular power requirement based on the usage location, a digital data power requirement based on the usage location, a time of day the user is at the usage location, and an application being used by the user at the time of day the user is at the usage location.

15. A computer system for ensuring a battery reserve, the computer system comprising:
one or more computer processors;
one or more computer readable storage media; and
program instructions stored on the one or more computer readable storage media for execution by at least one of the one or more computer processors, the program instructions comprising:
program instructions to determine a usage history of functions for a mobile device, wherein the determined usage history of the functions is based upon historical analytics for a user;
program instructions to monitor a battery reserve in the mobile device;
program instructions to identify a change in location of the mobile device from a first location to a second location;
program instructions to adjust a threshold battery reserve automatically based on the change in location of the mobile device;
program instructions to determine whether the adjusted threshold battery reserve for a battery in the mobile device has been met based upon the monitored battery reserve; and
responsive to determining that a threshold battery reserve for the battery in the mobile device has been met:
program instructions to determine a function to disable based on the determined usage history of the function for the mobile device and a current usage of the mobile device, wherein the current usage is based on the second location, and
program instructions to implement a power save mode for the mobile device to reduce battery consumption by the mobile device, wherein the power save mode includes disabling the function and utilizing at least one of a battery partition and a second battery.

16. The computer system of claim 15, wherein the power save mode includes turning off at least one application in the mobile device to reduce power consumption by the mobile device.

17. The computer system of claim 15, wherein the power save mode includes switching to at least one of: the battery partition in the battery of the mobile device which has not met the adjusted threshold battery reserve and to the second battery in the mobile device which has not met the adjusted threshold battery reserve, wherein the battery partition in the battery of the mobile device which has not met the adjusted threshold battery reserve and the second battery in the mobile device which has not met the adjusted threshold battery reserve are dedicated to at least one specific application included in the mobile device.

18. The computer system of claim 17, wherein the battery partition which has not met the adjusted threshold battery reserve only allows for a portion of the battery to be used for at least one specific application of the mobile device, wherein individual battery partitions are recharged in a particular priority, and wherein the particular priority is based on a selection by the user.

19. The computer system of claim 15, wherein the power save mode includes both turning off at least one application in the mobile device to reduce power consumption by the mobile device and at least one of: switching to the battery partition in the battery of the mobile device which has not met the adjusted threshold battery reserve or to the second battery in the mobile device which has not met the adjusted threshold battery reserve.

20. The computer system of claim 15, further comprising program instructions stored on the one or more computer readable storage media for execution by at least one of the one or more computer processors, to:
receive an indication from the user of the mobile device of a change in a battery configuration in the mobile device, wherein the battery configuration indicates a number of batteries in the mobile device and wherein the battery configuration indicates a number of battery partitions, a partition capacity for each of the number of battery partitions, and a specific application or plurality of applications assigned to each of the number of battery partitions for each battery in the mobile device.

* * * * *